United States Patent
Lin

(10) Patent No.: US 10,652,384 B1
(45) Date of Patent: May 12, 2020

(54) METHOD FOR GENERATING WIRELESS CHARGING ALIGNMENT LINE ON A MOBILE PHONE

(71) Applicant: Yi Sheng Lin, New Taipei (TW)

(72) Inventor: Yi Sheng Lin, New Taipei (TW)

(*) Notice: Subject to any disclaimer, the term of this patent is extended or adjusted under 35 U.S.C. 154(b) by 0 days.

(21) Appl. No.: 16/653,209

(22) Filed: Oct. 15, 2019

(51) Int. Cl.
*H04M 1/00* (2006.01)
*H04B 1/38* (2015.01)
*H04M 1/725* (2006.01)
*H02J 50/90* (2016.01)
*H02J 7/02* (2016.01)

(52) U.S. Cl.
CPC ......... *H04M 1/72527* (2013.01); *H02J 7/025* (2013.01); *H02J 50/90* (2016.02)

(58) Field of Classification Search
CPC .. H04B 5/0037; H04B 5/0075; H04B 5/0081; H04B 5/0087; H04B 5/0093; H04M 1/04; H04M 1/0262; H04M 1/1025; H04M 19/00; H02J 5/005; H02J 7/025; H02J 50/00; H02J 50/10; H02J 50/90
See application file for complete search history.

(56) References Cited

U.S. PATENT DOCUMENTS

| | | | | |
|---|---|---|---|---|
| 8,890,470 | B2* | 11/2014 | Partovi | H02J 50/80 |
| | | | | 320/108 |
| 8,922,162 | B2* | 12/2014 | Park | H02J 7/00 |
| | | | | 320/108 |
| 9,083,198 | B2* | 7/2015 | Sutarwala | H02J 7/025 |
| 10,072,947 | B1* | 9/2018 | Mantler | G01B 7/31 |
| 10,137,794 | B2* | 11/2018 | Logvinov | B60L 53/12 |
| 10,498,164 | B2* | 12/2019 | Wang | H02J 7/025 |
| 2018/0287413 | A1* | 10/2018 | Jung | H02J 7/00 |
| 2020/0076220 | A1* | 3/2020 | Chow | H02J 50/10 |

* cited by examiner

*Primary Examiner* — Quochien B Vuong
(74) *Attorney, Agent, or Firm* — Rabin & Berdo, P.C.

(57) ABSTRACT

A method for generating a wireless charging alignment line on a mobile phone, applicable to a wireless charging device with a corresponding symbol, comprising: starting an application in the mobile phone and generating an operation screen, and placing the mobile phone on a wireless charging device; moving the mobile phone according to indication of the operation screen, and generating a first unchargeable line, a first preferred charging line, a second unchargeable line, and a second preferred charging line on the operation screen sequentially, the application calculating a median value according to the first unchargeable line, the first preferred charging line, the second unchargeable line, and the second preferred charging line position, and displaying an alignment line on the operation screen according to the median value. As such, the mobile phone can be aligned with the wireless charging device by the alignment line for optimal charging efficiency.

9 Claims, 8 Drawing Sheets

METHOD FOR GENERATING WIRELESS CHARGING ALIGNMENT LINE ON A MOBILE PHONE

BACKGROUND OF THE INVENTION

1. Field of the Invention

The technical field generally relates to charging a mobile phone, and in particular, to generating an alignment line on a mobile phone screen to facilitate accurate placement on a wireless charging device to obtain an optimal charging effect.

2. The Prior Arts

Wireless charging technology is to supply power by non-physical contact. As the technology matures, it is more and more popular. Various types of electronic mobile devices, such as mobile phones and tablet computers, adopt the charging technology. However, to improve the wireless charging efficiency, the charging position of the electronic device and the wireless charger must be accurately aligned when charging. To this end, the inventor has previously devised an alignment method for a mobile phone and a wireless charging device, wherein the wireless charging device is provided with a corresponding symbol on the surface on which the mobile phone is placed, and then the application in the mobile phone is activated and operated. An alignment line is generated on the screen, and the alignment line must be aligned with the corresponding symbol during placing the mobile phone on the wireless charging device, so that the mobile phone can be located at the optimal charging position on the wireless charging device, thereby to obtain the best charging efficiency from the process.

In the above method, how does the application generate the alignment line on the screen of the mobile phone? In addition to the information provided by the mobile phone manufacturer, the manufacturer must continuously experiment and test. To simplify the operation, the inventor has devised a method of generating a wireless charging alignment line on a mobile phone.

SUMMARY OF THE INVENTION

The primary object of the present invention is to provide a method for generating a wireless charging alignment line on a mobile phone, which mainly uses an application installed in a mobile phone and in combination with moving the mobile phone on a wireless charging device, and utilizes the sensing state of the wireless charging coil in the mobile phone and the wireless charging coil in the wireless charging device to define a plurality of marking lines at different positions, and then obtains the intermediate position of all the marking lines to display on the screen, which is the alignment line of the best charging position for the mobile phone.

To achieve the above object, the present invention provides a method for generating a wireless charging alignment line on a mobile phone, comprising: starting an application in the mobile phone and generating an operation screen, and placing the mobile phone on a wireless charging device;

moving the mobile phone according to indication of the operation screen, and generating a first unchargeable line on the operation screen;

moving the mobile phone according to the indication on the operation screen, and generating a first preferred charging line on the operation screen;

moving the mobile phone according to the indication of the operation screen, and generating a second unchargeable line on the operation screen, using center of the mobile phone as a center, the first unchargeable line and the second unchargeable line being located on opposite sides;

moving the mobile phone according to the indication of the operation screen, and generating a second preferred charging line on the operation screen, using center of the mobile phone as a center, the first preferred charging line and the second preferred charging line being located on opposite sides;

the application calculating a median value according to the first unchargeable line, the first preferred charging line, the second unchargeable line, and the second preferred charging line position, and displaying an alignment line on the operation screen according to the median value.

In a preferred embodiment, the indication of the operation screen is by at least one of displaying an arrow, displaying a text, or a voice prompt.

In a preferred embodiment, when the application is started, an initial line appears on the operation screen, and at least one corresponding symbol is additionally disposed on the wireless charging device; during placing the mobile phone in the wireless charging device, the initial line is aligned to the corresponding symbol.

In a preferred embodiment, the step of defining the first unchargeable line, the first preferred charging line, the second unchargeable line, and the second preferred charging line in the operation screen is to move first the mobile phone according to the indication of the operation screen, and stop moving when a predetermined display signal appears on the operation screen; then, use a finger to touch to move a movable line in the operation screen, and stop moving when the movable line is aligned with the corresponding symbol; then, use a finger to touch a confirmation box displayed on the operation screen to cause the application to generate the first unchargeable line to appearing in the operation screen; similarly, the first preferred charging line, the second unchargeable line, and the second preferred charging line are generated in the same manner.

In a preferred embodiment, the application can synchronously connect to a cloud server database, and synchronously update the cloud server database with obtained alignment data of the mobile phone.

The present invention has the following specific effects:

1. The application installed on the mobile phone can quickly and conveniently generate an alignment line on the mobile phone with simple operation;

2. The application can synchronously connect to the cloud server database and update the data synchronously. Therefore, once updated once, the user can connect to the cloud server database, and the position of the most accurate alignment line can be obtained synchronously.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
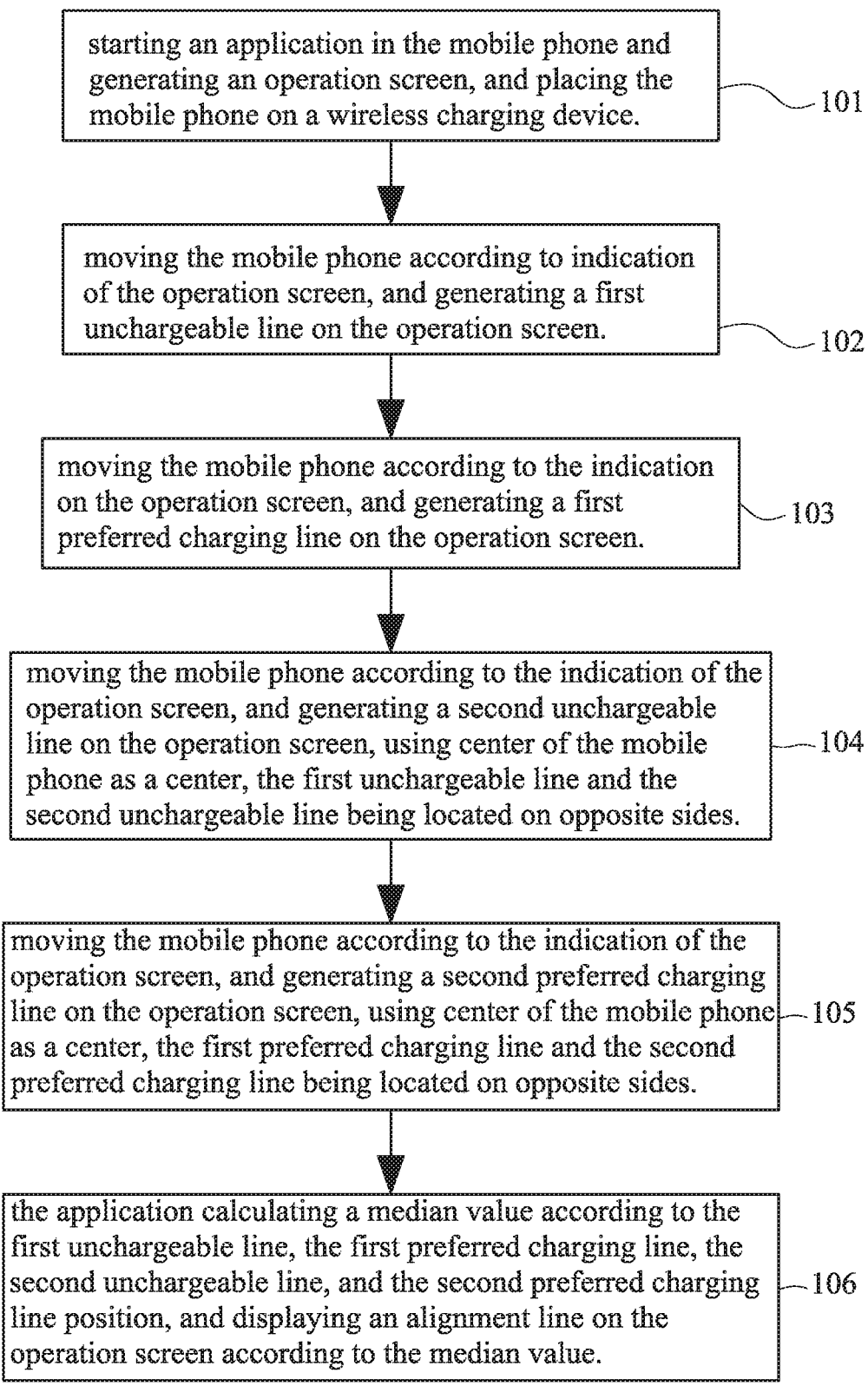
FIG. 1 is a flowchart of a method for generating a wireless charging alignment line on a mobile phone according to the present invention.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a flowchart of a method for generating a wireless charging alignment line on a mobile phone according to the present invention. The method comprises:

Step 101: starting an application in the mobile phone and generating an operation screen, and placing the mobile phone on a wireless charging device;

Step 102: moving the mobile phone according to indication of the operation screen, and generating a first unchargeable line on the operation screen;

Step 103: moving the mobile phone according to the indication on the operation screen, and generating a first preferred charging line on the operation screen;

Step 104: moving the mobile phone according to the indication of the operation screen, and generating a second unchargeable line on the operation screen, using center of the mobile phone as a center, the first unchargeable line and the second unchargeable line being located on opposite sides;

Step 105: moving the mobile phone according to the indication of the operation screen, and generating a second preferred charging line on the operation screen, using center of the mobile phone as a center, the first preferred charging line and the second preferred charging line being located on opposite sides;

Step 106: the application calculating a median value according to the first unchargeable line, the first preferred charging line, the second unchargeable line, and the second preferred charging line position, and displaying an alignment line on the operation screen according to the median value.

As such, when the mobile phone is placed in the wireless charging device, the mobile phone can quickly complete the alignment operation with the wireless charging device, and maintain better charging performance in the subsequent wireless charging process.

Figure 2:
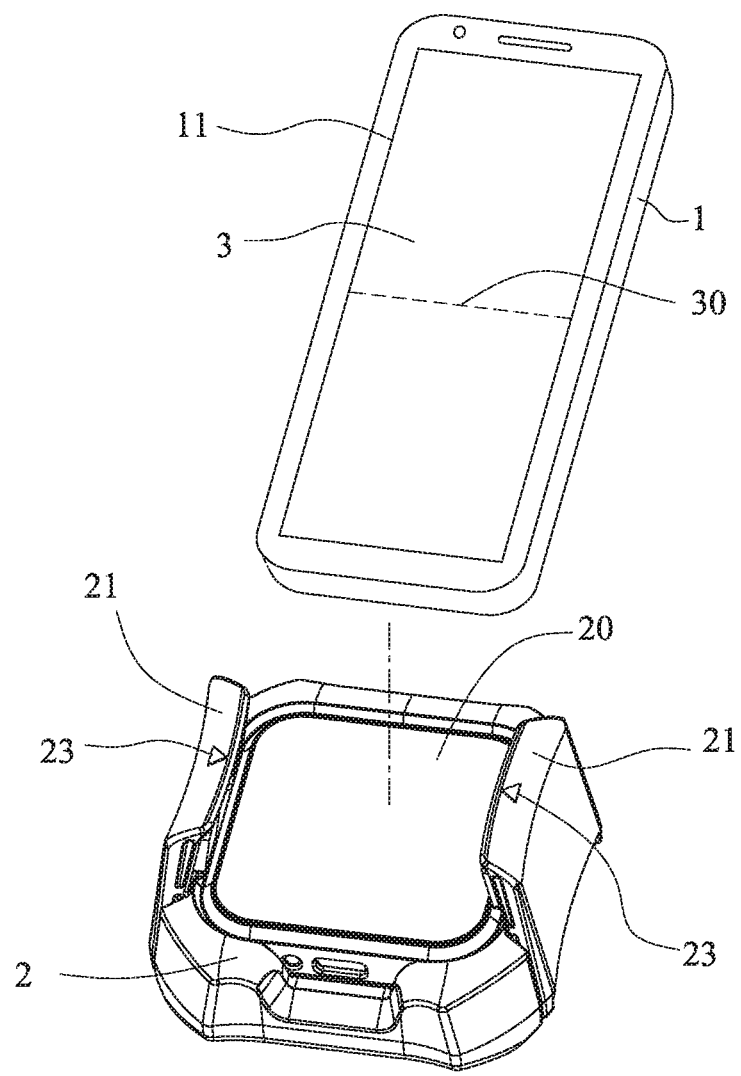
FIG. 2 is a schematic view of a mobile phone and a wireless charging device used in conjunction with the method of the present invention.

As shown in FIG. 2, a schematic view of a mobile phone and a wireless charging device used in conjunction with the method of the present invention, the mobile phone 1 has a display screen 11. The mobile phone 1 is installed with an application and displays an operation screen 3 on the display screen 11. The wireless charging device 2 comprises a placement surface 20 and two clamping arms 21 for holding the mobile phone 1. The two clamping arms 21 can be moved closer to or away from each other through pull. The wireless charging device 2 has a wireless charging module, and the wireless charging module uses the current wireless charging technology, which will not be described in detail herein. The wireless charging device 2 is further disposed with at least one corresponding symbol 23, and the corresponding symbol 23 is located in the charging working area of the wireless charging module. In the present embodiment, the position between two corresponding symbols 23 is the optimal charging location. Further, in the present embodiment, the corresponding symbol 23 is located on the surface of the clamping arm 21.

Figure 3:
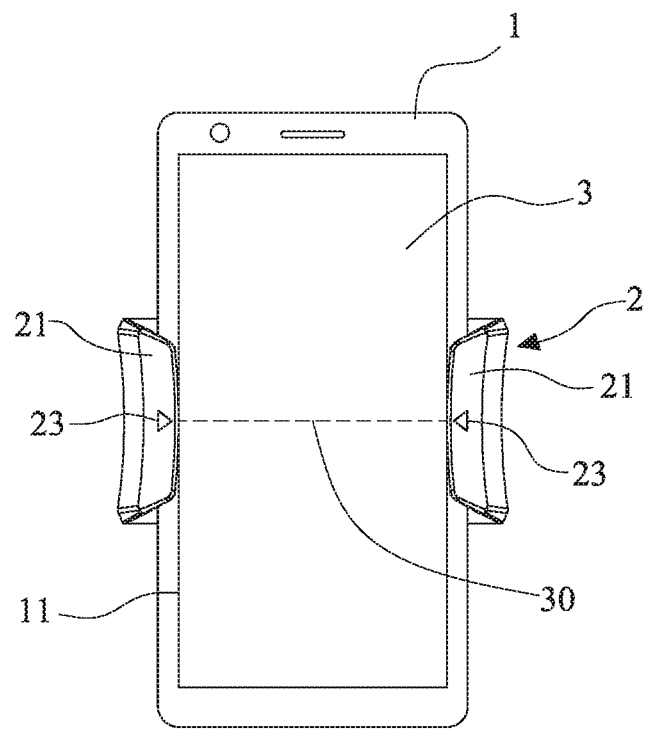
FIG. 3 is a schematic view of displaying an initial line on a mobile phone by the method for generating a wireless charging alignment line on a mobile phone of the present invention.

Then, the following operation figures and the above steps are described in detail. In the subsequent steps, the wireless charging device 2 is fixed and does not move:

As shown in FIG. 3, in step 101, when the application is launched, an initial line 30 appears on the operation screen 3. The position of the initial line 30 may be at the middle of the operation screen 3, or the data recorded by previously using the application, or a preset position. The initial line 30 is only for the user to place the mobile phone 1 on the wireless charging device 2, and the middle position of the mobile phone 1 is close to the corresponding symbol 23 for the purpose of activating the wireless charging process between the mobile phone 1 and the wireless charging device 2.

Figure 4A:
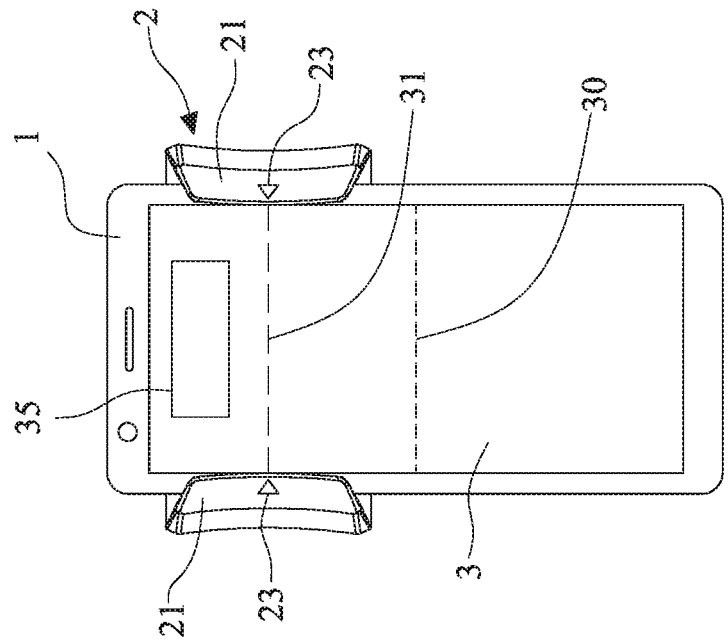
FIG. 4A is a schematic view (1) showing an operation screen on a mobile phone according to the method of the present invention.
Figure 4B:
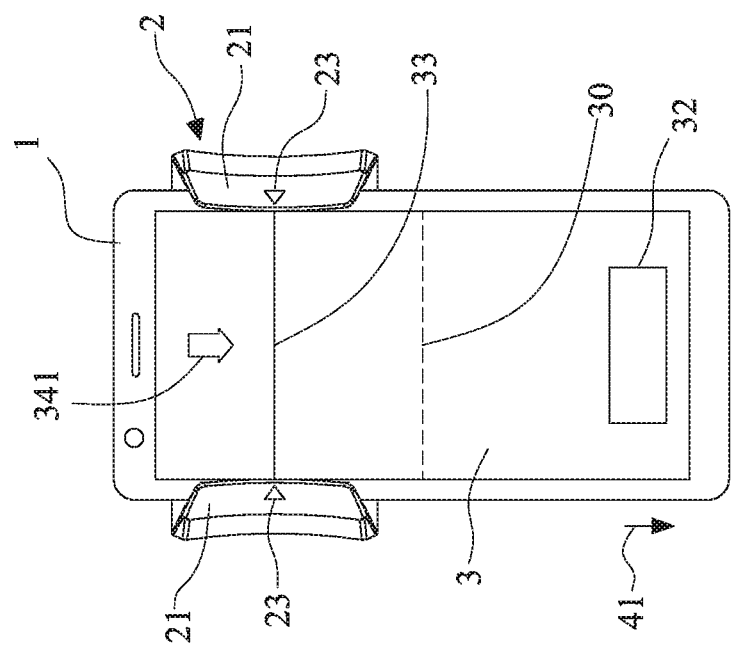
FIG. 4B is a schematic view showing a first unchargeable line on the operation screen according to the method of the present invention.

As shown in FIG. 4A and FIG. 4B, step 102 defines the first unchargeable line 31 on the operation screen 3. As shown in FIG. 4A, the step further comprises: the operation screen 3 indicating to move the mobile phone 1 in a first direction 41, and stop the movement when a display signal 32, such as suspending charging or failure to charge, appearing on the operation screen 3. Then, the user uses a finger to touch to move a movable line 33 on the operation screen 3, and stops the movement when the movable line 33 is aligned with the corresponding symbol 23. In the present embodiment, the indication of the operation screen 3 can be displayed in at least one of: an arrow, a text, or a voice prompt. As shown, a downward arrow 341 is displayed. The first direction 41 is toward the lower edge of the mobile phone 1, that is, in the downward direction of the figure. As shown in FIG. 4B, after the movable line 33 is at the correct position, the user touches a confirmation box 35 displayed on the operation screen 3 with a finger, and the application displays the first unchargeable line 31 on the operation screen 3 (as the uppermost dash line shown in the figure). Herein, the position represents a position where the wireless charging device 2 cannot perform charging on the mobile phone 1.

Figure 5A:
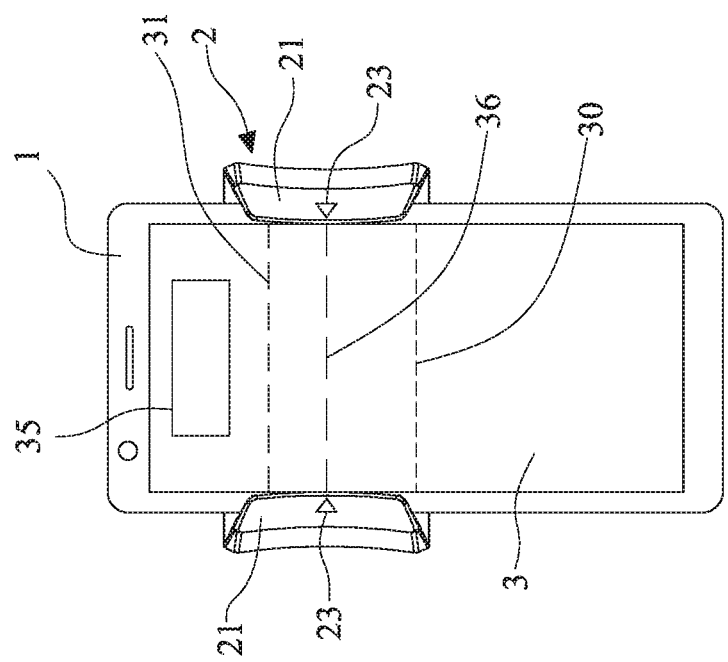
FIG. 5A is a schematic view (2) showing an operation screen on the mobile phone according to the method of the present invention.
Figure 5B:
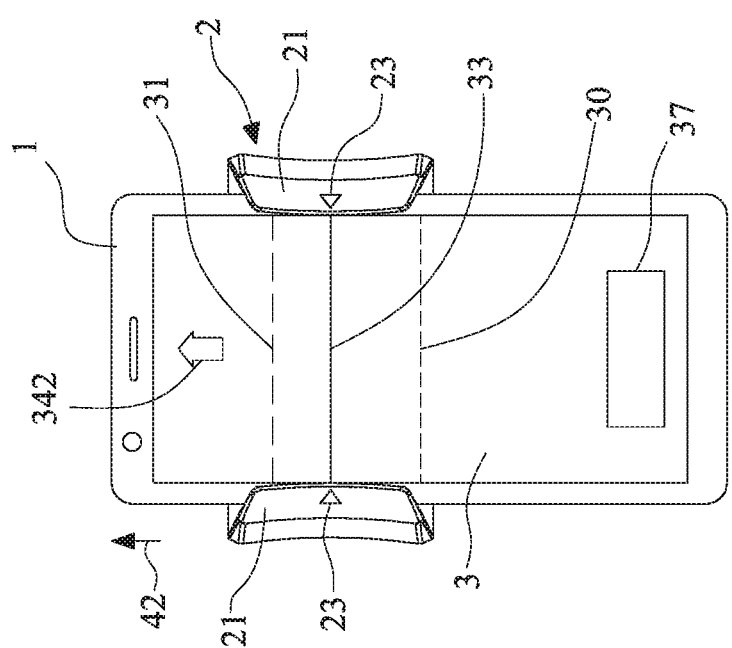
FIG. 5B is a schematic view showing a first preferred charging line on the operation screen according to the method of the present invention.

As shown in FIG. 5A and FIG. 5B, step 103 defines the first preferred charging line 36 on the operation screen 3. As shown in FIG. 5A, the step further comprises: the operation screen 3 indicating to move the mobile phone 1 in a second direction 42, and stop the movement when a display signal 37 indicating a predetermined charging efficiency appearing on the operation screen 3. Then, the user uses a finger to touch to move a movable line 33 on the operation screen 3, and stops the movement when the movable line 33 is aligned with the corresponding symbol 23. In the present embodiment, the second direction 42 is toward the upper edge of the mobile phone 1, that is, in the upward direction of the figure. Correspondingly, the indication of the operation screen 3 is an upward arrow 342. The display signal 37 displays the charging efficiency is 25%, but not limited to the specific number. As shown in FIG. 5B, after the movable line 33 is at the correct position, the user touches a confirmation box 35 displayed on the operation screen 3 with a finger, and the application displays the first preferred charging line 36 on the operation screen 3.

Figure 6A:
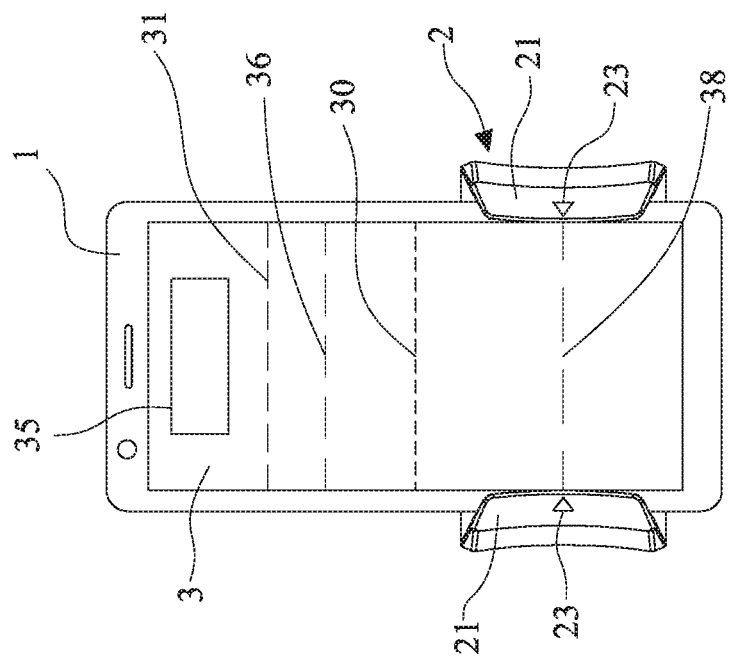
FIG. 6A is a schematic view (3) showing an operation screen on the mobile phone according to the method of the present invention.
Figure 6B:
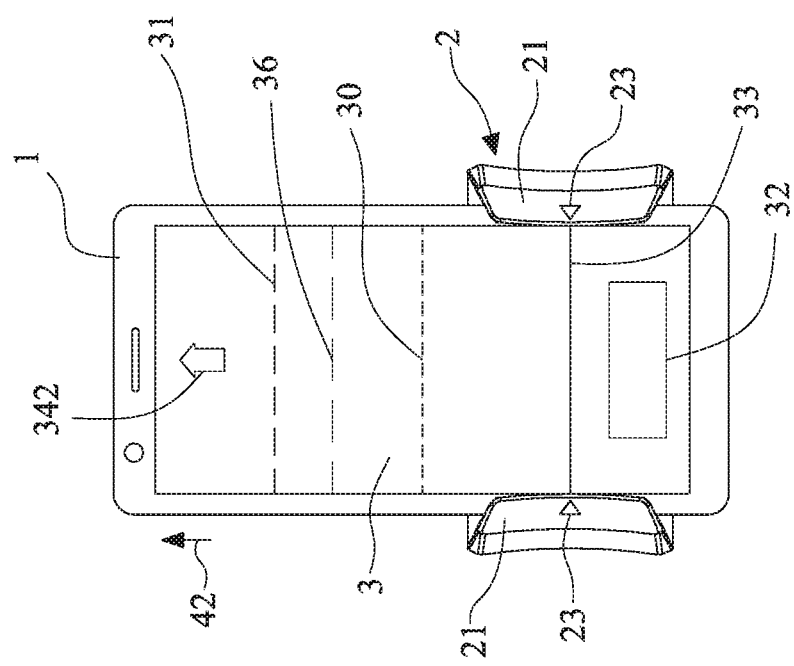
FIG. 6B is a schematic view showing a second unchargeable line on the operation screen according to the method of the present invention.

As shown in FIG. 6A and FIG. 6B, step 104 defines the second unchargeable line 38 on the operation screen 3. As shown in FIG. 6A, the step further comprises: the operation screen 3 indicating to move the mobile phone 1 in the second direction 42, and stop the movement when a display signal 32, such as suspending charging or failure to charge, appearing on the operation screen 3. Then, the user uses a finger to touch to move a movable line 33 on the operation screen 3, and stops the movement when the movable line 33 is aligned with the corresponding symbol 23. As shown in FIG. 6B, after the movable line 33 is at the correct position, the user touches a confirmation box 35 displayed on the operation screen 3 with a finger, and the application displays the second unchargeable line 38 on the operation screen 3. Herein, the position represents the lowest position where the wireless charging device 2 cannot perform charging on the mobile phone 1.

Figure 7A:
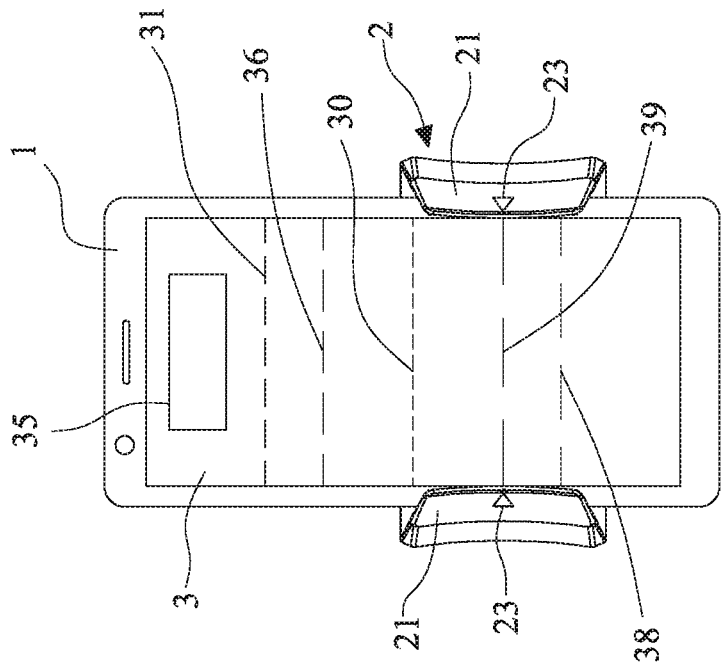
FIG. 7A is a schematic view (4) showing an operation screen on the mobile phone according to the method of the present invention.
Figure 7B:
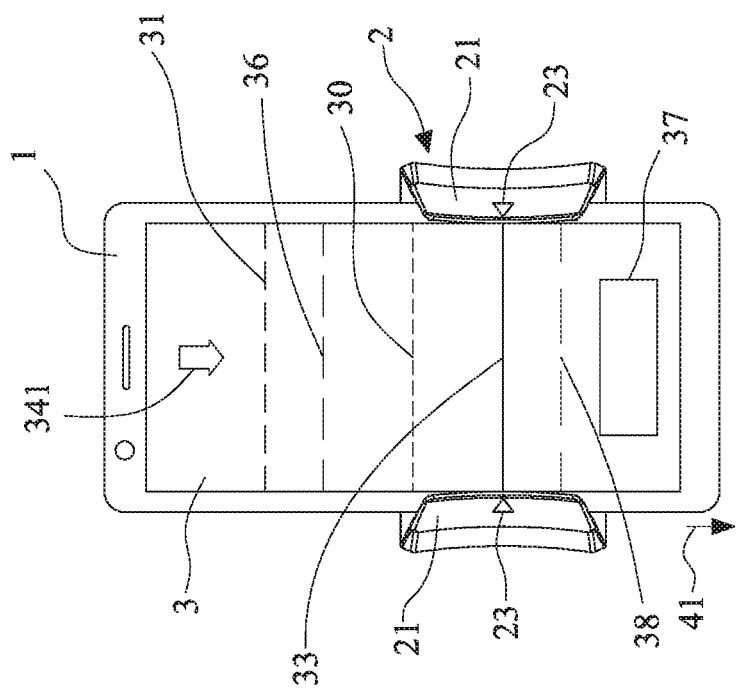
FIG. 7B is a schematic view showing a second preferred charging line on the operation screen according to the method of the present invention.

As shown in FIG. 7A and FIG. 7B, step 105 defines the second preferred charging line 39 on the operation screen 3. As shown in FIG. 7A, the step further comprises: the operation screen 3 indicating to move the mobile phone 1 in the first direction 41, and stop the movement when a display signal 37 indicating a predetermined charging efficiency appearing on the operation screen 3. Then, the user uses a finger to touch to move a movable line 33 on the operation screen 3, and stops the movement when the movable line 33 is aligned with the corresponding symbol 23. In the present embodiment, the display signal 37 displays the charging efficiency is 25%, but not limited to the specific number. As shown in FIG. 7B, after the movable line 33 is at the correct position, the user touches a confirmation box 35 displayed on the operation screen 3 with a finger, and the application displays the second preferred charging line 39 on the operation screen 3

Figure 8:
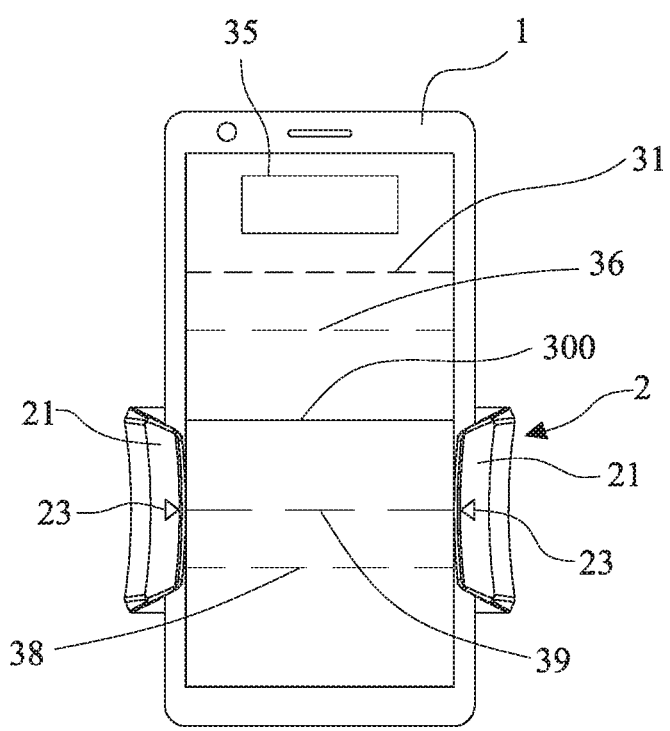
FIG. 8 is a schematic view showing an alignment line on the operation screen in conjunction with the method of the present invention.

As shown in FIG. 8, in step 106, after the calculation of the application, an alignment line 300 is displayed on the operation screen 3. This alignment line 300 is the optimal charging position of the mobile phone 1.

When the user wants to perform a wireless charging operation in the future, when the charging mode of the application is activated, the alignment line 300 is displayed on the operation screen 3, and the user only needs to place the mobile phone 1 on the wireless charging device 2, with the alignment line 300 aligned with the corresponding symbol 23 on the wireless charging device 2, which means that the mobile phone 1 is accurately placed on the wireless charging device 2 and charged at an optimum charging efficiency.

In addition, the application of the present invention can be connected to a cloud server database. After obtaining the alignment line 300 of the new mobile phone according to the present invention, the application synchronously updates the cloud server database, and subsequently the users only need to connect to the cloud server to obtain the most accurate alignment line 300 from the cloud server synchronously.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for generating a wireless charging alignment line on a mobile phone, comprising:
    starting an application in the mobile phone and generating an operation screen, and placing the mobile phone on a wireless charging device;
    moving the mobile phone according to indication of the operation screen, and generating a first unchargeable line on the operation screen;
    moving the mobile phone according to the indication on the operation screen, and generating a first preferred charging line on the operation screen;
    moving the mobile phone according to the indication of the operation screen, and generating a second unchargeable line on the operation screen, using center of the mobile phone as a center, the first unchargeable line and the second unchargeable line being located on opposite sides;
    moving the mobile phone according to the indication of the operation screen, and generating a second preferred charging line on the operation screen, using center of the mobile phone as a center, the first preferred charging line and the second preferred charging line being located on opposite sides;
    the application calculating a median value according to the first unchargeable line, the first preferred charging line, the second unchargeable line, and the second preferred charging line position, and displaying an alignment line on the operation screen according to the median value.

2. The method for generating a wireless charging alignment line on a mobile phone as claimed in claim 1, wherein the indication of the operation screen is by at least one of displaying an arrow, displaying a text, or a voice prompt.

3. The method for generating a wireless charging alignment line on a mobile phone as claimed in claim 1, wherein when the application is started, an initial line appears on the operation screen, and at least one corresponding symbol is additionally disposed on the wireless charging device; during placing the mobile phone in the wireless charging device, the initial line is aligned to the corresponding symbol.

4. The method for generating a wireless charging alignment line on a mobile phone as claimed in claim 3, wherein position of the initial line is at the middle of the operation screen, or a data recorded by previously using the application, or a preset position.

5. The method for generating a wireless charging alignment line on a mobile phone as claimed in claim 3, wherein the step of defining the first unchargeable line on the operation screen comprises: first moving the mobile phone towards a first direction according to the indication of the operation screen, and stopping moving when a display signal showing suspending charging or failure to charge appearing on the operation screen; using a finger to touch to move a movable line in the operation screen, and stopping moving when the movable line being aligned with the corresponding symbol; then, using a finger to touch a confirmation box displayed on the operation screen to cause the application to generate the first unchargeable line to appearing in the operation screen.

6. The method for generating a wireless charging alignment line on a mobile phone as claimed in claim 5, wherein the step of defining the first preferred charging line on the operation screen comprises: first moving the mobile phone towards a second direction according to the indication of the operation screen, the second direction being opposite to the first direction, and stopping moving when a display signal showing predetermined charging efficiency appearing on the operation screen; using a finger to touch to move a movable line in the operation screen, and stopping moving when the movable line being aligned with the corresponding symbol; then, using a finger to touch a confirmation box displayed on the operation screen to cause the application to generate the first preferred charging line to appearing in the operation screen.

7. The method for generating a wireless charging alignment line on a mobile phone as claimed in claim 6, wherein the step of defining the second unchargeable line on the operation screen comprises: first moving the mobile phone towards the second direction according to the indication of the operation screen, and stopping moving when a display signal showing suspending charging or failure to charge appearing on the operation screen; using a finger to touch to move a movable line in the operation screen, and stopping moving when the movable line being aligned with the corresponding symbol; then, using a finger to touch a confirmation box displayed on the operation screen to cause the application to generate the second unchargeable line to appearing in the operation screen.

8. The method for generating a wireless charging alignment line on a mobile phone as claimed in claim 7, wherein the step of defining the second preferred charging line on the operation screen comprises: first moving the mobile phone towards the first direction according to the indication of the operation screen, and stopping moving when a display signal showing predetermined charging efficiency appearing on the operation screen; using a finger to touch to move a movable line in the operation screen, and stopping moving when the movable line being aligned with the corresponding symbol; then, using a finger to touch a confirmation box displayed on the operation screen to cause the application to generate the second preferred charging line to appearing in the operation screen.

9. The method for generating a wireless charging alignment line on a mobile phone as claimed in claim 1, wherein the application can synchronously connect to a cloud server database, and synchronously update the cloud server database with obtained alignment data of the mobile phone.

* * * * *